US012706888B2

(12) United States Patent
Kim et al.

(10) Patent No.: US 12,706,888 B2
(45) Date of Patent: Aug. 11, 2026

(54) ELECTRONIC DEVICE AND METHOD FOR UPLOADING DATA OF EXTERNAL ELECTRONIC DEVICE IN ELECTRONIC DEVICE

(71) Applicant: Samsung Electronics Co., Ltd., Suwon-si (KR)

(72) Inventors: Dowan Kim, Suwon-si (KR); Jinsoo Kim, Suwon-si (KR); Sooyong Eom, Suwon-si (KR); Yoserb Yi, Suwon-si (KR); Jubong Lee, Suwon-si (KR); Seokhyun Kim, Suwon-si (KR); Junhyung Park, Suwon-si (KR); Gajin Song, Suwon-si (KR); Sunkey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 18/492,294

(22) Filed: Oct. 23, 2023

(65) Prior Publication Data

US 2024/0137349 A1 Apr. 25, 2024
US 2024/0236054 A9 Jul. 11, 2024

Related U.S. Application Data

(63) Continuation of application No. PCT/KR2023/016410, filed on Oct. 20, 2023.

(30) Foreign Application Priority Data

Oct. 21, 2022 (KR) ........................ 10-2022-0136816
Nov. 15, 2022 (KR) ........................ 10-2022-0152680

(51) Int. Cl.
*H04L 9/40* (2022.01)
*H04L 9/08* (2006.01)
(Continued)

(52) U.S. Cl.
CPC ........ *H04L 63/0428* (2013.01); *H04L 9/0825* (2013.01); *H04L 9/3213* (2013.01);
(Continued)

(58) Field of Classification Search
None
See application file for complete search history.

(56) References Cited

U.S. PATENT DOCUMENTS 9,294,550 B2 * 3/2016 Song ........................ H04L 67/10
9,626,359 B1 * 4/2017 Sun ........................ G06F 21/125
(Continued)

FOREIGN PATENT DOCUMENTS

EP 3 839 821 A2 6/2021
KR 10-2007-0029864 A 3/2007
(Continued)

OTHER PUBLICATIONS

International Search report and written opinion dated Jan. 24, 2024, issued in International Application No. PCT/KR2023/016410.
(Continued)

*Primary Examiner* — Lashonda Jacobs-Burton
(74) *Attorney, Agent, or Firm* — Jefferson IP Law, LLP

(57) ABSTRACT

An electronic device includes a communication circuit, and at least one processor connected to the communication circuit. The at least one processor may be configured to broadcast a device identification (ID) of the electronic device and an Internet protocol (IP) address of the electronic device through the communication circuit. The at least one processor may be configured to receive a token encrypted by an external electronic device and data of the external electronic device through the communication circuit. The at least one processor may be configured to decrypt the encrypted token by using a private key of the electronic device. The at least one processor may be configured to transmit the data of
(Continued)

the external electronic device to a server in a cloud by using the decrypted token through the communication circuit.

9 Claims, 13 Drawing Sheets

(51) Int. Cl.
*H04L 9/32* (2006.01)
*H04L 61/5007* (2022.01)
*H04L 67/02* (2022.01)

(52) U.S. Cl.
CPC ........ *H04L 61/5007* (2022.05); *H04L 63/166* (2013.01); *H04L 67/02* (2013.01)

(56) References Cited

U.S. PATENT DOCUMENTS 9,774,599 B2 * 9/2017 Seo ..................... H04L 63/0861
10,382,203 B1 * 8/2019 Loladia ................... H04L 63/06
10,560,507 B2 2/2020 Lavoie et al.
10,645,459 B2 5/2020 Lindsey et al.
11,133,934 B2 9/2021 Abadir et al.
11,184,332 B2 * 11/2021 Jeong .................... H04W 12/06
11,470,535 B1 10/2022 Thomason
12,155,879 B2 * 11/2024 Daily ................. H04N 21/6125
2007/0058815 A1 3/2007 Kwak et al.
2009/0259667 A1 10/2009 Wang et al.
2014/0006773 A1 * 1/2014 Chazalet ............. H04L 63/0464
713/150
2015/0127942 A1 * 5/2015 Lee ....................... G06F 21/602
713/168
2015/0312289 A1 10/2015 Shen et al.
2017/0201585 A1 7/2017 Doraiswamy et al.
2017/0201875 A1 7/2017 Lee
2017/0206218 A1 * 7/2017 Jai ....................... G06F 16/2255
2017/0208641 A1 * 7/2017 Lee ......................... H04W 4/06
2021/0044972 A1 * 2/2021 Murray ................. G06F 21/602
2022/0209940 A1 * 6/2022 Woo ...................... H04L 9/3247
2022/0321543 A1 10/2022 Djakovic
2023/0164033 A1 5/2023 Lee et al.
2024/0179145 A1 * 5/2024 Bao ....................... H04L 63/083
2024/0380615 A1 * 11/2024 Jeon ...................... H04L 9/3273

FOREIGN PATENT DOCUMENTS

KR 10-2012-0086611 A 8/2012
KR 10-2013-0065069 A 6/2013
KR 10-2016-0046535 A 4/2016
KR 10-2017-0111809 A 10/2017
KR 10-2156077 B1 9/2020
KR 10-2021-0058313 A 5/2021
WO 2022/019682 A1 1/2022

OTHER PUBLICATIONS

Extended European Office Action dated Jan. 2, 2026, issued in European Application No. 23880303.5-1218.

* cited by examiner

ELECTRONIC DEVICE AND METHOD FOR UPLOADING DATA OF EXTERNAL ELECTRONIC DEVICE IN ELECTRONIC DEVICE

CROSS-REFERENCE TO RELATED APPLICATION(S)

This application is a continuation application, claiming priority under § 365(c), of an International application No. PCT/KR2023/016410, filed on Oct. 20, 2023, which is based on and claims the benefit of a Korean patent application number 10-2022-0136816, filed on Oct. 21, 2022, in the Korean Intellectual Property Office, and of a Korean patent application number 10-2022-0152680, filed on Nov. 15, 2022, in the Korean Intellectual Property Office, the disclosure of each of which is incorporated by reference herein in its entirety.

TECHNICAL FIELD

The disclosure relates to an electronic device and a method for uploading data of an external electronic device in the electronic device.

BACKGROUND ART

The Internet of things (IoT) refers to a technology of embedding sensors and communication functions in various things and connecting the things to the Internet.

The IoT is an artificial intelligence technology in which things connected through the Internet autonomously perform analysis by exchanging data and provide learned information to a user, or a user may remotely control the things. Here, things include various embedded systems, such as home appliances, mobile equipment, and wearable devices. Things connected to the IoT need to be connected to the Internet using a unique Internet protocol (IP) capable of distinguishing the things, and sensors may be embedded in the things in order to acquire data from an external environment.

The IoT is also highly applicable to control various electronic devices in home. Users may control electronic devices, such as televisions (TVs), washing machines, air conditioners, etc., to perform specialized services in the IoT environment in home, and may easily share information relating thereto.

The foregoing information may be provided as a related art to facilitate understanding of the disclosure. No claim or determination is made as to whether any of the foregoing is applicable as a prior art associated with the disclosure.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Solution

In accordance with an aspect of the disclosure, an electronic device includes a communication circuit, and at least one processor connected to the communication circuit. The at least one processor may be configured to broadcast a device identification (ID) of the electronic device and an IP address of the electronic device through the communication circuit. The at least one processor may be configured to receive a token encrypted by an external electronic device and data of the external electronic device through the communication circuit. The at least one processor may be configured to decrypt the encrypted token by using a private key of the electronic device. The at least one processor may be configured to transmit the data of the external electronic device to a server in a cloud by using the decrypted token through the communication circuit.

In accordance with another aspect of the disclosure, an electronic device includes a communication circuit, and at least one processor connected to the communication circuit. The at least one processor may be configured to receive a device ID of an external electronic device and an IP address of the external electronic device through the communication circuit. The at least one processor may be configured to receive a token related to the device ID of the external electronic device from a server in a cloud through the communication circuit. The at least one processor may be configured to encrypt the token related to the device ID of the external electronic device when the electronic device is identified as failing to transmit data to the server for a preconfigured period of time. The at least one processor may be configured to transmit the encrypted token and the data of the electronic device to the external electronic device through the communication circuit.

In accordance with another aspect of the disclosure, a method for operating an electronic device may include broadcasting a device ID of the electronic device and an IP address of the electronic device through a communication circuit. The method for operating the electronic device may include receiving a token encrypted by the external electronic device and data of the external electronic device through the communication circuit. The method for operating the electronic device may include decrypting the encrypted token by using a private key of the electronic device. The method for operating the electronic device may include transmitting, to a server in a cloud, the data of the external electronic device by using the decrypted token.

In accordance with another aspect of the disclosure, a method for operating an electronic device may include receiving a device ID of an external electronic device and an IP address of the external electronic device. The method for operating the electronic device may include receiving a token related to the device ID of the external electronic device from a server in a cloud. The method for operating the electronic device may include encrypting the token related to the device ID of the external electronic device when the electronic device is identified as failing to transmit data to the server for a preconfigured period of time. The method for operating the electronic device may include transmitting the encrypted token and the data of the electronic device to the external electronic device.

In accordance with another aspect of the disclosure, at least one non-transitory computer-readable storage medium storing at least one instruction may be provided. The at least one instruction may be configured to, when executed by at least one processor, cause the electronic device to perform multiple operations. The multiple operations may include broadcasting a device ID of the electronic device and an IP address of the electronic device. The multiple operations may include receiving a token encrypted by an external electronic device and data of the external electronic device. The multiple operations may include decrypting the encrypted token by using a private key of the electronic device. The multiple operations may include transmitting the data of the external electronic device to a server in a cloud by using the decrypted token.

In accordance with another aspect of the disclosure, at least one non-transitory computer-readable storage medium storing at least one instruction may be provided. The at least one instruction may be configured to, when executed by at least one processor, cause the electronic device to perform multiple operations. The multiple operations may include receiving a device ID of an external electronic device and an IP address of the external electronic device. The multiple operations may include receiving a token related to the device ID of the external electronic device from a server in a cloud. The multiple operations may include encrypting the token related to the device ID of the external electronic device when the electronic device is identified as failing to transmit data to the server for a preconfigured period of time. The multiple operations may include transmitting the encrypted token and the data of the electronic device to the external electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

Figure 1:
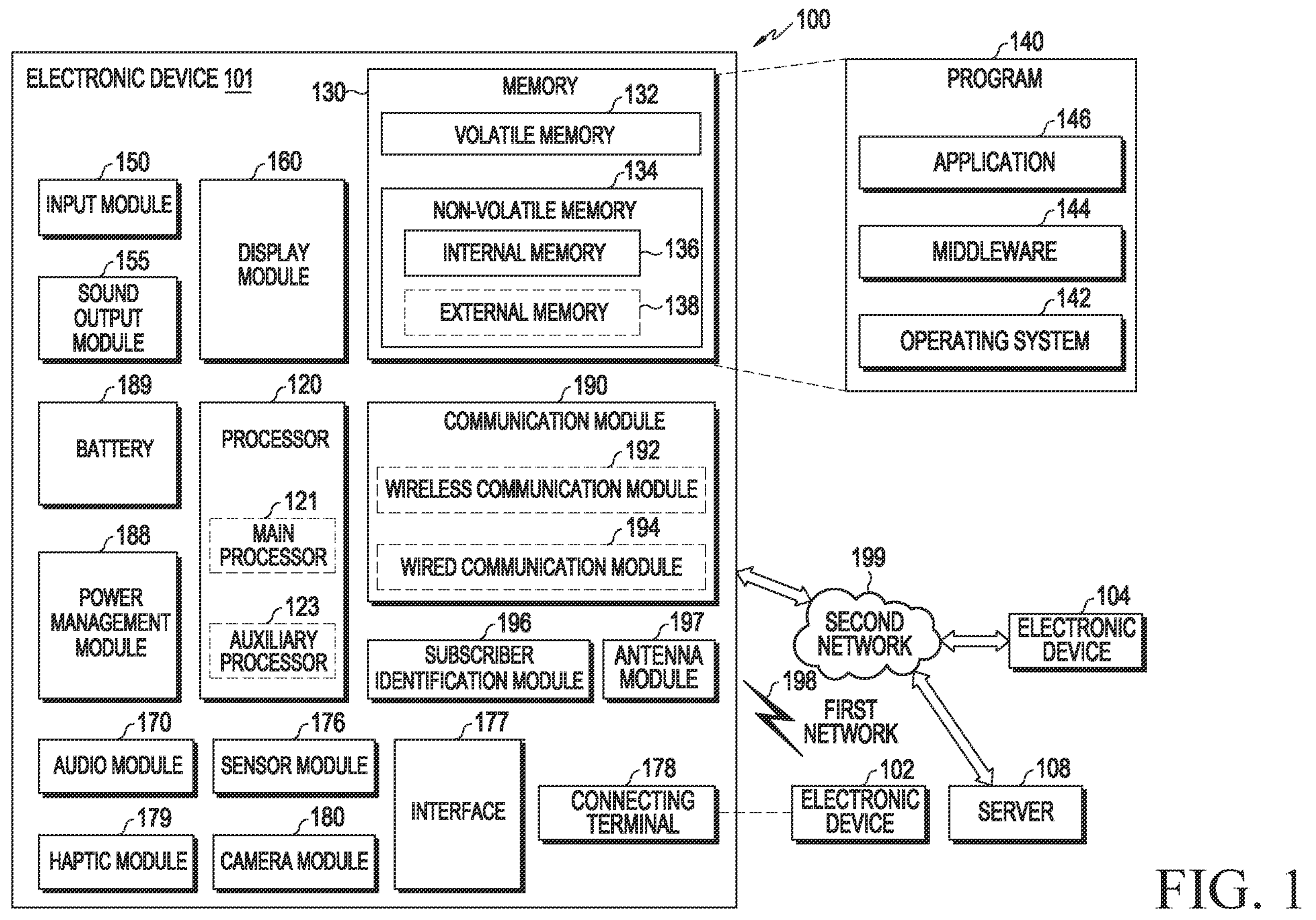
FIG. 1 is a block diagram schematically illustrating an electronic device in a network environment according to an embodiment of the disclosure.

Hereinafter, embodiments of the disclosure will be described in detail with reference to the accompanying drawings. In describing various embodiments of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe specific embodiments, and are not intended to limit the disclosure. Alternatively, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Alternatively, when the technical terms used herein are wrong technical terms that cannot correctly represent the idea of the disclosure, it should be appreciated that they are replaced by technical terms correctly understood by those skilled in the art. Alternatively, the general terms used herein should be interpreted as defined in dictionaries or interpreted in the context of the relevant part, and should not be interpreted to have excessively restricted meanings.

Alternatively, a singular expression used herein may include a plural expression unless they are definitely different in the context. As used herein, such an expression as "comprises" or "include" should not be interpreted to necessarily include all elements or all steps described in the specification, and should be interpreted to be allowed to exclude some of them or further include additional elements or steps.

Alternatively, the terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them. Hereinafter, various embodiments of the disclosure will be described in detail with reference to the accompanying drawings. Regardless of drawing signs, the same or like elements are provided with the same reference numeral, and a repeated description thereof will be omitted. In describing the disclosure, descriptions related to technical contents well-known in the art and not associated directly with the disclosure will be omitted. Further, it should be noted that the accompanying drawings are presented merely to help easy understanding of the disclosure, and are not intended to limit the disclosure. The technical idea of the disclosure should be construed to cover all changes, equivalents, and alternatives, in addition to the drawings.

In the following, a terminal will be described in various embodiments of the disclosure, but the terminal may also be called an electronic device, a mobile station, a mobile equipment (ME), a user equipment (UE), a user terminal (UT), a subscriber station (SS), a wireless device, a handheld device, or an access terminal (AT). Alternatively, in various embodiments of the disclosure, the terminal may be a device having a communication function, such as a mobile phone, a personal digital assistant (PDA), a smartphone, a wireless modem, or a notebook.

Alternatively, in describing various embodiments of the disclosure, reference will be made to the standards provided by institute of electrical and electronics engineers (IEEE) and wireless fidelity (Wi-Fi) alliance (WFA) that are wireless access standardization groups, but based on determinations by those skilled in the art, the main idea of the disclosure may be applied to other communication systems having similar backgrounds through some modifications without significantly departing from the scope of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
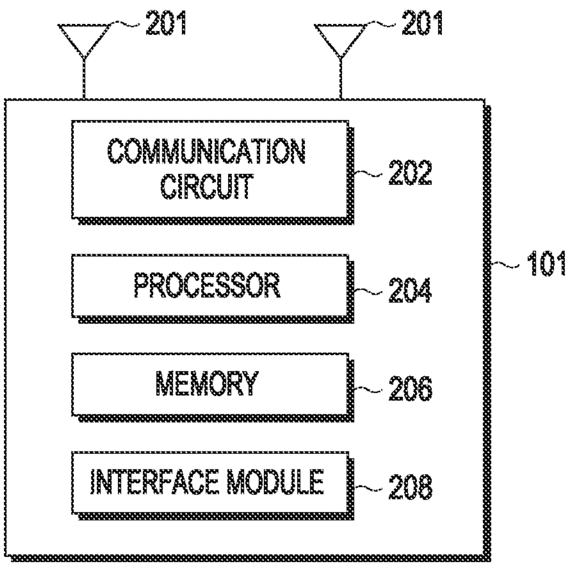
FIG. 2 is a block diagram of an electronic device according to an embodiment of the disclosure.

FIG. 2 is a block diagram of an electronic device according to an embodiment of the disclosure.

Referring to FIG. 2, an electronic device 101 may include an external electronic device (e.g., the electronic device 102 or 104 of FIG. 1), and a communication circuit 202 (e.g., the communication module 190 of FIG. 1) configured to transmit or receive signals to or from a peer device, for example, by using one or more antennas 201.

The electronic device 101 may include a processor 204 (e.g., the processor 120 of FIG. 1) that may be implemented using one or more single-core processors or one or more multi-core processors, and a memory 206 (e.g., the memory 130 of FIG. 1) configured to store instructions for the operation of the electronic device 101.

The electronic device 101 may include an interface module 208 (e.g., the interface 177 of FIG. 1) configured to provide a wired and/or wireless interface for communication with components outside the network. At least a part of the one or more antennas 201, the communication circuit 202, or the interface module 208 may be implemented, for example, by at least a part of the communication module 190 and antenna module 198 of FIG. 1. Referring to FIG. 2, although one or more antennas 201 are illustrated as being disposed outside the electronic device 101, this is for convenience of explanation. Those skilled in the art will easily understand that the one or more antennas 201 may be located inside a housing constituting the outer shape of the electronic device 101 and/or in at least a part thereof, and this may be applied to other drawings as well.

Figure 3:
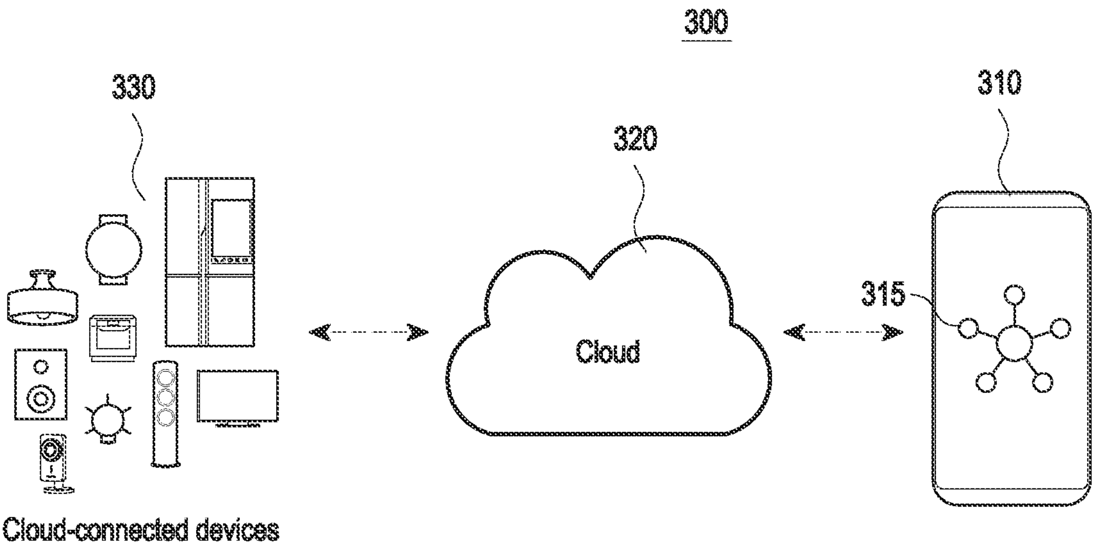
FIG. 3 illustrates an Internet of things (IoT) environment according to an embodiment of the disclosure.

FIG. 3 illustrates an IoT environment according to an embodiment of the disclosure.

Referring to FIG. 3, an IoT environment 300 may include an electronic device 310, a cloud 320, and cloud-connected devices 330. According to an embodiment, the IoT environment 300 may imply a type of platform that connects cloud-connected devices 330, such as home appliances, via various types of communication networks and relays and controls them by the cloud 320 and/or a local server. According to an embodiment, the IoT environment 300 may provide device search and control while supporting various communication protocols, such as Bluetooth (BT), Bluetooth low energy (BLE), Wi-Fi, peer-to-peer (P2P) network, universal plug and play (UPnP), Cloud, or ultra-wideband (UWB). According to an embodiment, the IoT environment 300 may be implemented as an open platform to be able to connect not only a specific brand of sensor or product but also other brands of products. According to an embodiment, the IoT environment 300 may be implemented as a closed platform to be able to connect a specific brand of sensor and product.

According to an embodiment, an application 315 (e.g., the application 146 of FIG. 1) executable by an operating system (e.g., the operating system 142 of FIG. 1) may be installed on the electronic device 310 (e.g., the electronic device 101 of FIG. 1). According to an embodiment, the application 315 may be preloaded on the electronic device 310 when manufactured or be downloaded from an external electronic device (e.g., the electronic device 102 or 104 of FIG. 1 or the server 108 of FIG. 1) or updated. According to an embodiment, the application 315 may identify the state of the cloud-connected devices 330 registered in the server in the cloud 320 and control the cloud-connected devices 330. According to an embodiment, the application 315 may control the cloud-connected devices 330 registered in the server in the cloud 320 to be automatically operated at a predetermined time or receive notifications from the cloud-connected devices 330. According to an embodiment, the application 315 may control and/or manage smart home appliances or Internet of Things (IoT) through the electronic device 310 and may be connected to nearby devices in a wired and/or wireless manner. For example, the cloud-connected devices 330 may include at least one of TVs, speakers, refrigerators, kimchi refrigerators, wine cellars, washers, driers, air dressers, ovens, dish washers, cooktops, robot vacuums, air conditioners, and air purifiers.

Figure 4:
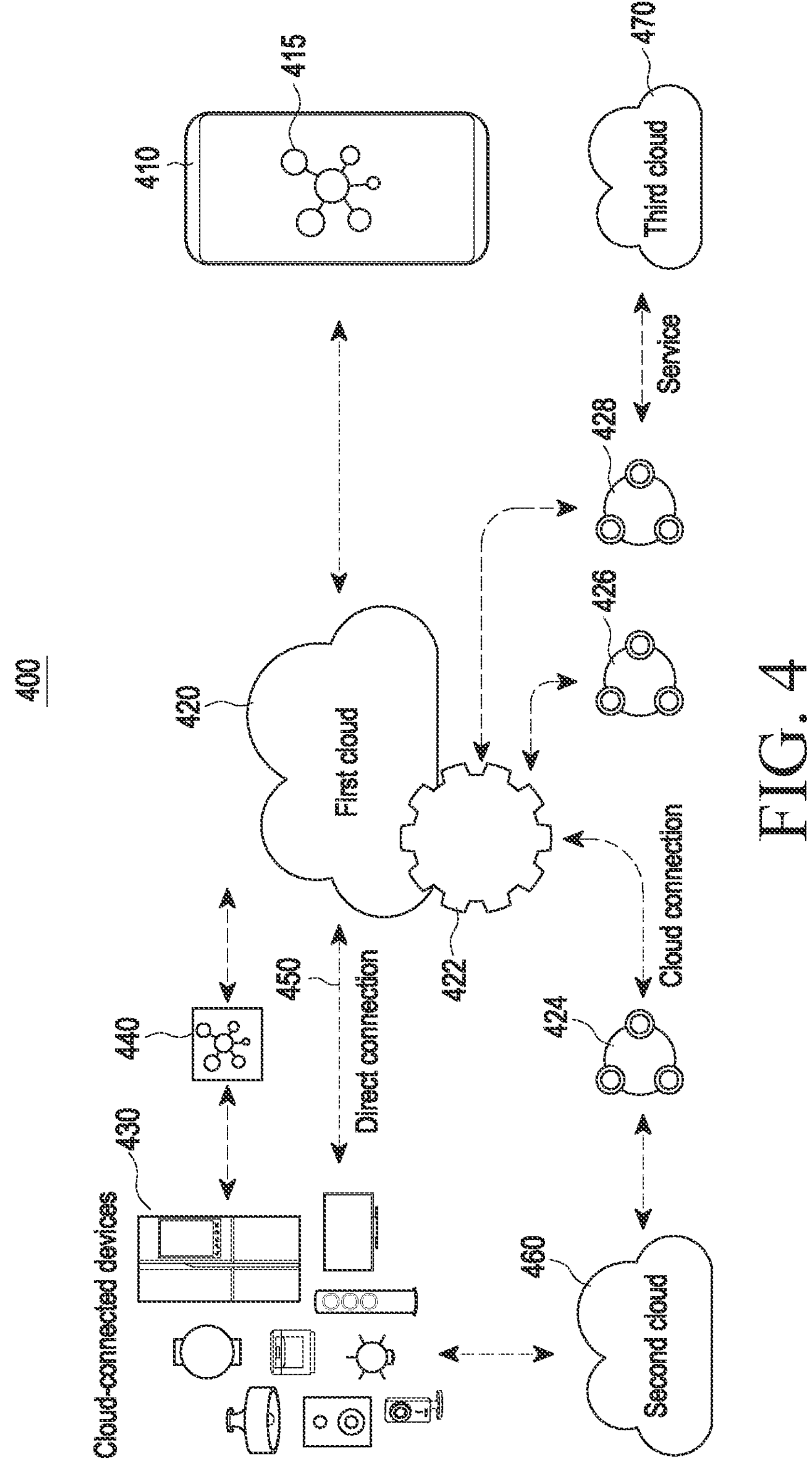
FIG. 4 illustrates an IoT environment according to an embodiment of the disclosure.

FIG. 4 illustrates an IoT environment according to an embodiment of the disclosure.

Referring to FIG. 4, an IoT environment 400 may include an electronic device 410, a first cloud 420, cloud-connected devices 430 (e.g., the cloud-connected devices 330 of FIG. 3), a hub 440, a second cloud 460, and/or a third cloud 470. According to an embodiment, the IoT environment 400 may provide substantially the same or similar environment to the IoT environment 300 described in connection with FIG. 3. According to an embodiment, an application 415 (e.g., the application 146 of FIG. 1) executable by an operating system (e.g., the operating system 142 of FIG. 1) may be installed on the electronic device 410 (e.g., the electronic device 101 of FIG. 1). According to an embodiment, the application 415 may identify the state of the cloud-connected devices 430 registered in the server in the first cloud 420 and may control the cloud-connected devices 430. According to an embodiment, the application 415 may control the cloud-connected devices 430 registered in the server in the first cloud 420 to be automatically operated at a predetermined time or may receive notifications from the cloud-connected devices 430. According to an embodiment, the application 415 may control and/or manage smart home appliances or Internet of Things (IoT) through the electronic device 310 and may be connected to nearby devices in a wired and/or wireless manner.

According to an embodiment, the first cloud 420 may include a server that manages or controls the electronic device 410 and the cloud-connected devices 430. According to an embodiment, the server in the first cloud 420 may store information transmitted/received between the electronic device 410 and the cloud-connected devices 430, may relay communication between the electronic device 410 and the cloud-connected devices 430, and may support communication of the electronic device 410 and the cloud-connected devices 430. According to an embodiment, the first cloud 420 may implement an application programming interface (API) which is a language or message format used for communication between an operating system and an application program. According to an embodiment, the first cloud 420 may be connected to the cloud-connected devices 430 via the hub 440. According to an embodiment, the hub 440 may imply a device (e.g., gateway) that relays communication between the first cloud 420 and the cloud-connected devices 430. According to an embodiment, the hub 440 may be a device implemented in the first cloud 420 or implemented as a separate device (e.g., external server). According to an embodiment, the first cloud 420 may be connected to the cloud-connected devices 430 via direct connection 450 without using the hub 440.

According to an embodiment, the first cloud 420 may be connected to the cloud connector 424 by using the API 422 and communicate with the second cloud 460. According to an embodiment, the operator who provides service on the first cloud 420 may differ from the operator who provides service on the second cloud 460. According to an embodiment, the cloud connector 424 may relay communication between different clouds (e.g., the first cloud 420 and the second cloud 460). According to an embodiment, the cloud connector 424 may be a hardware device or software module implemented in the first cloud 420. According to an embodiment, the cloud connector 424 may be a hardware device or software module implemented outside the first cloud 420. According to an embodiment, the cloud connector 424 may be a separate server implemented outside the first cloud 420. According to an embodiment, the cloud-connected devices 430 may be connected to the first cloud 420 through the hub 440 or direct connection 450. According to an embodiment, the cloud-connected devices 430 may be connected to a second cloud 460 different from the first cloud 420 through the hub or direct connection. According to an embodiment, the cloud-connected devices 430 may be connected to only one of the first cloud 420 and the cloud 460. According to an embodiment, the cloud-connected devices 430 may be simultaneously connected to the first cloud 420 and the cloud 460.

According to an embodiment, the first cloud 420 may be connected to an automation function 426 by using the API 422. The automation function 426 may control each of the cloud-connected devices 430 connected to the first cloud 420 to perform its defined operation without a user command (or input) when a condition configured in the application 415 by the user is satisfied. According to an embodiment, the automation function 426 may be a hardware device or software module implemented in the first cloud 420. According to an embodiment, the automation function 426 may be a hardware device or software module implemented outside the first cloud 420. According to an embodiment, the automation function 426 may be a separate server implemented outside the first cloud 420. According to an embodiment, in response to a user input, the application 415 may configure various conditions, such as time (e.g., a specific time, a specific time period, always, or day), a device state, a member location (e.g., identify on whether it is in the initially configured place), a place state, or weather. According to an embodiment, when the condition configured by the application 415 is satisfied, the automation function 426 may control the cloud-connected devices 430 connected to the first cloud 420 to perform functions, such as a device control, a smartphone notification, a voice message reproduction through speaker, place state change, or mode execution without a user command (or input).

According to an embodiment, the first cloud 420 may be connected to the cloud connector 428 by using the API 422 and communicate with the third cloud 470. According to an embodiment, the operator who provides service on the first cloud 420 may differ from the operator who provides service on the third cloud 470. According to an embodiment, the cloud connector 428 may relay communication between different clouds (e.g., the first cloud 420 and the third cloud 470). According to an embodiment, the cloud connector 428 may be a hardware device or software module implemented in the first cloud 420. According to an embodiment, the cloud connector 428 may be a hardware device or software module implemented outside the first cloud 420. According to an embodiment, the cloud connector 428 may be a separate server implemented outside the first cloud 420.

Figure 5:
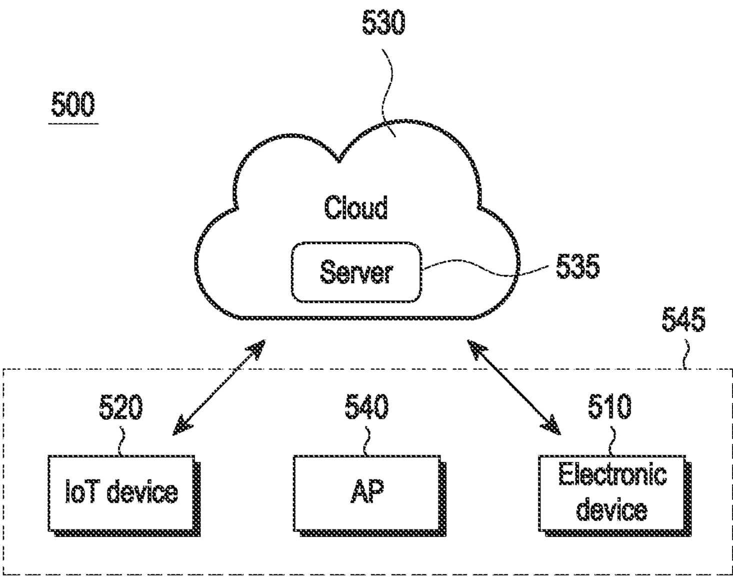
FIG. 5 illustrates a system including an electronic device according to an embodiment of the disclosure.

FIG. 5 illustrates a system including an electronic device according to an embodiment of the disclosure.

Referring to FIG. 5, a system 500 may include an electronic device 510 (e.g., an edge device), an IoT device 520 (e.g., an IoT camera), a cloud 530, and an access point (AP) 540. According to an embodiment, a server 535 is implemented in the cloud 530, and the server 535 may control the operation of the cloud 530. According to an embodiment, the electronic device 510 and the IoT device 520 may communicate with the cloud 530 within a coverage 545 of the AP 540.

In case that the IoT device 520 in a network (e.g., a home network) fails to upload data (or clips) to the cloud 530 within a preconfigured period of time (e.g., 5 minutes), the IoT device 520 may need to delete corresponding data (or clips) due to a limited memory capacity (e g, limited capacity of random access memory (RAM) and/or flash of an IoT camera). In case that the data (or clips) to be provided by the IoT device 520 is deleted, the user may not identify the corresponding data (or clip). For example, the IoT device 520 may generate a 10 second mp4 file and transmit the generated mp4 file to the cloud 530. When the IoT device 520 fails to transmit the generated mp4 file within 5 minutes to the cloud 530, the corresponding mp4 file may be deleted. For example, the cloud 530 displays, as "!", an mp4 file that has failed to be transmitted, and the corresponding mp4 file may not be provided to the user.

According to an embodiment, when the IoT device 520 in the network fails to upload data (or clips) to the cloud 530, the electronic device 510 may upload the data (or clips) of the IoT device 520 to the cloud 530 on behalf of the IoT device 520. According to an embodiment, in case that the IoT device 520 is not able to upload data (or clips) to the cloud 530 because the network environment is poor and that the corresponding data (or clips) should be deleted, the IoT device 520 may transfer corresponding data (or clips) to the electronic device 510 having sufficient storage capacity. According to an embodiment, when the network environment improves again, the electronic device 510 may upload corresponding data (or clips) to the cloud 530 on behalf of the IoT device 520, and the cloud 530 may provide data (or clips) recorded by the IoT device 520 to a user without omission.

According to an embodiment, the IoT device 520 may receive a certificate and a one-time token of the electronic device 510 from the cloud 530. According to an embodiment, the certificate of the electronic device 510 may be configured based on a private key of the electronic device 510. According to an embodiment, the IoT device 520 may encrypt a one-time token using the certificate of the electronic device 510. According to an embodiment, the IoT device 520 may transfer the encrypted one-time token and data (or clips) to a hypertext transfer protocol (HTTP) server (or an address by which the electronic device 510 receives information from the IoT device 520). According to an embodiment, the electronic device 510 may decrypt the encrypted one-time token by using a private key, and when the decryption is successful, the electronic device 510 may recognize (or trust) that the IoT device 520 is a device of a user account.

According to an embodiment, the IoT device 520 may encrypt data (or clips) by using the certificate of the electronic device 510. According to an embodiment, the IoT device 520 may transfer encrypted data (or clips) to the HTTP server. According to an embodiment, the electronic device 510 may decrypt encrypted data (or clips) using a private key.

According to an embodiment, the IoT device 520 may encrypt a one-time token and data (or clips) by using a certificate of the electronic device 510. According to an embodiment, the IoT device 520 may transmit the encrypted one-time token and encrypted data (or clips) to an HTTP server. According to an embodiment, the electronic device 510 may decrypt each of the encrypted one-time token and the encrypted data (or clips) by using a private key.

According to an embodiment, the IoT device 520 and the electronic device 510 are devices registered to the same user account, and the cloud 530 may recognize them.

According to an embodiment, when the IoT device 520 is registered to a user account, a device ID and an HTTP server address may be broadcast periodically using a multicast domain name system (MDNS) to all devices within the same AP. According to an embodiment, in case that the electronic device 510 is a portable device, the electronic device 510 may be repeatedly connected to or disconnected from a corresponding AP, and each time, the electronic device 510 may broadcast an HTTP server address including an IP address. According to an embodiment, the HTTP server may refer to a computer program (or a software component included in another program) that plays the role of a server in a client-server model by implementing a server part of the HTTP and/or HTTPS network protocol.

According to an embodiment, the IoT device 520 may receive information broadcast from the electronic device 510, and the electronic device 510 may transmit a request for identifying whether the electronic device 510 is registered to the same user account as that of the IoT device 520 to the cloud 530 by using the received device ID of the electronic device 510. According to an embodiment, in case that, as a result of the identification, the electronic device 510 is a device registered to the same user account as that of the IoT device 520, the IoT device 520 may receive an issued one-time token corresponding to the device ID of the electronic device 510 from the cloud 530. According to an embodiment, the IoT device 520 may store a one-time token issued from the cloud 530. According to an embodiment, a one-time token corresponding to the device ID of the electronic device 510 may allow the electronic device 510 to be connected to the cloud 530 on behalf of the IoT device 520. According to an embodiment, the IoT device 520 may receive, from the cloud 530, a root certificate authority (CA) of the IoT device 520, which is used at the time of establishing a transport layer security (TLS) session with the HTTP server of the electronic device 510, and a certificate for encryption of only the electronic device 510 while allowing decryption thereof, and may store the root CA and the certificate.

According to an embodiment, when the IoT device 520 generates data (or clips) and fails to upload the data (or clips) to the cloud 530 within a preconfigured period of time, the IoT device 520 may attempt access the HTTP server address of the electronic device 510 received in advance. According to an embodiment, when the IoT device 520 successfully accesses the HTTP server address, the IoT device 520 may transfer the corresponding data (or clips) and an encrypted one-time token to the HTTP server address.

According to an embodiment, the IoT device 520 may establish a one-way TLS session at the time of accessing the HTTP server by using the root CA of the electronic device 510 received from the cloud 530. According to an embodiment, the IoT device 520 may identify that the electronic device 510 corresponds to a broadcast device ID.

According to an embodiment, the IoT device 520 may encrypt a token by using a certificate of the electronic device 510 received from the cloud 530, and may transfer the encrypted token to the HTTP server (or an address by which the electronic device 510 receives information from the IoT device 520) together with data (or clips). According to an embodiment, the electronic device 510 may decrypt the encrypted token by using a private key, and when the encrypted token is successfully decrypted, the electronic device 510 may identify that the IoT device 520 is a device registered to the same user account.

According to an embodiment, the electronic device 510 may store data (or clips) received from the IoT device 520 when it is identified that the IoT device 520 is trustworthy. According to an embodiment, the electronic device 510 may refresh the one-time token, which is received from the IoT device 520, to a long-lived token. According to an embodiment, the one-time token is a token allowed by the cloud 530 so that the electronic device 510 is able to perform the operation of the IoT device 520. According to an embodiment, the one-time token is refreshed to a long-lived token, and the electronic device 510 may periodically upload data (or clips) to the cloud 530 on behalf of the IoT device 520 without a timeout by using the long-lived token.

According to an embodiment, the IoT device 520 may obtain a list of multiple electronic devices and utilize each of them as a candidate server. According to an embodiment, when the IoT device 520 fails to upload data (or clips) to the cloud 530 within a preconfigured period of time, the IoT device 520 may sequentially access an HTTP server according to the list of multiple electronic devices.

According to an embodiment, when the IoT device 520 fails to upload data (or clips) to the cloud 530 within a preconfigured period of time, the IoT device 520 may access an HTTP server for an electronic device having the top ranked weight first in the list of multiple electronic devices, that is, in a descending order of weights configured by a user. According to an embodiment, the IoT device 520 may access an HTTP server for an electronic device having the top ranked weight first in the list of multiple electronic devices, that is, in a descending order of weights configured by the user, and additional access weight may be assigned to an electronic device frequently used by the user.

According to an embodiment, in case that the electronic device 510 is a portable device, connection to or disconnection from a specific AP may be repeated and an IP address is changeable, thereby resulting in changing the HTTP server address. According to an embodiment, the IoT device 520 may update an HTTP server value based on the latest information at the time of receiving information of a device ID previously registered in a list of multiple electronic devices.

According to an embodiment, in case that the electronic device 510 is a portable device, the electronic device may deviate the coverage of a specific AP, and here, TLS error of an HTTP server to which access is attempted by the IoT device 520 occurs, and accordingly the IoT device 520 may attempt access to another electronic device in the list of multiple electronic devices.

Figure 6:
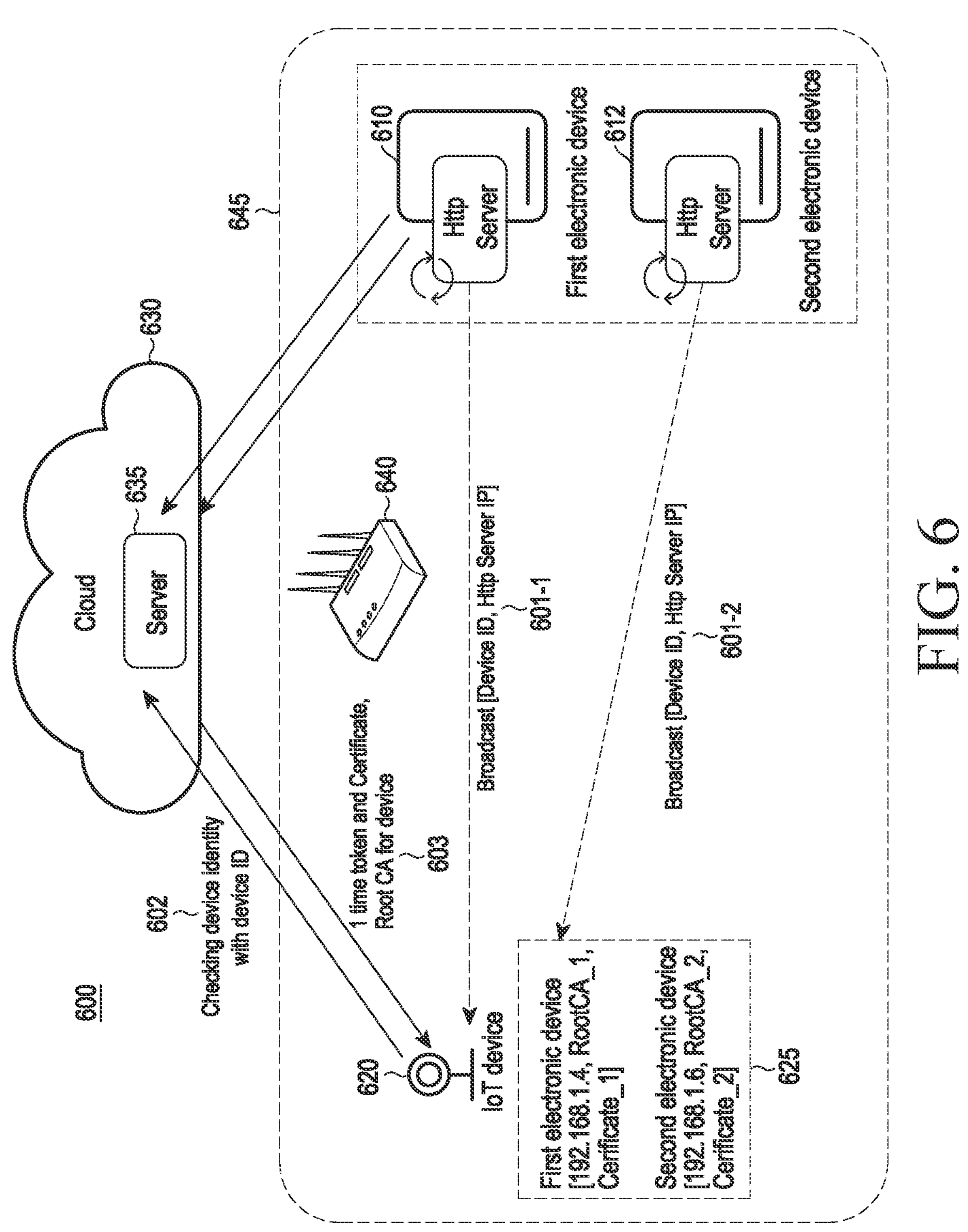
FIG. 6 illustrates an operation in which an IoT device receives information of an electronic device according to an embodiment of the disclosure.

FIG. 6 illustrates an operation in which an IoT device receives information of an electronic device according to an embodiment of the disclosure. Referring to FIG. 6, a system 600 may include a first electronic device 610, a second electronic device 612, an IoT device 620, a cloud 630, and an AP 640. According to an embodiment, a server 635 is implemented in the cloud 630, and the server 635 may control the operation of the cloud 630. According to an embodiment, each of the first electronic device 610, the second electronic device 612, and the IoT device 620 may communicate with the cloud 630 within a coverage 645 of the AP 640. In an embodiment, at least one of operations 601 to 603 may be omitted, the order of some operations may be changed, or another operation may be added.

In operation 601-1, the first electronic device 610 may broadcast a device ID and Http server IP of the first electronic device 610. In operation 601-2, the second electronic device 612 may broadcast a device ID and Http server IP of the second electronic device 612. According to an embodiment, an Http server may refer to a computer program (or a software component included in another program) that plays the role of a server in a client-server model by implementing the server part of the HTTP and/or HTTPS network protocol(s).

In operation 602, the IoT device 620 may transfer at least one of the device ID of the first electronic device 610 and the device ID of the second electronic device 612 to the cloud 630, and may identify the identity of at least one of the first electronic device 610 and the second electronic device 612.

In operation 603, the cloud 630 may transmit a one-time token, a certificate, and a Root CA for at least one of the first electronic device 610 and the second electronic device 612 to the IoT device 620. According to an embodiment, the IoT device 620 may store the Http server IP (e.g., 192.168.1.4), Root CA_1, and Certificate_1 for the first electronic device 610. According to an embodiment, the IoT device 620 may store an Http server IP (e.g., 192.168.1.6), Root CA_2, and Certificate_2 for the second electronic device 612. According to an embodiment, the IoT device 620 may store a list 625 of multiple electronic devices (e.g., the first electronic device 610 and the second electronic device 612) configured to broadcast device IDs and Http server IPs, and the Http server IP, root CA, and certificate for each of multiple electronic devices may be included in the list 625.

Figure 7:
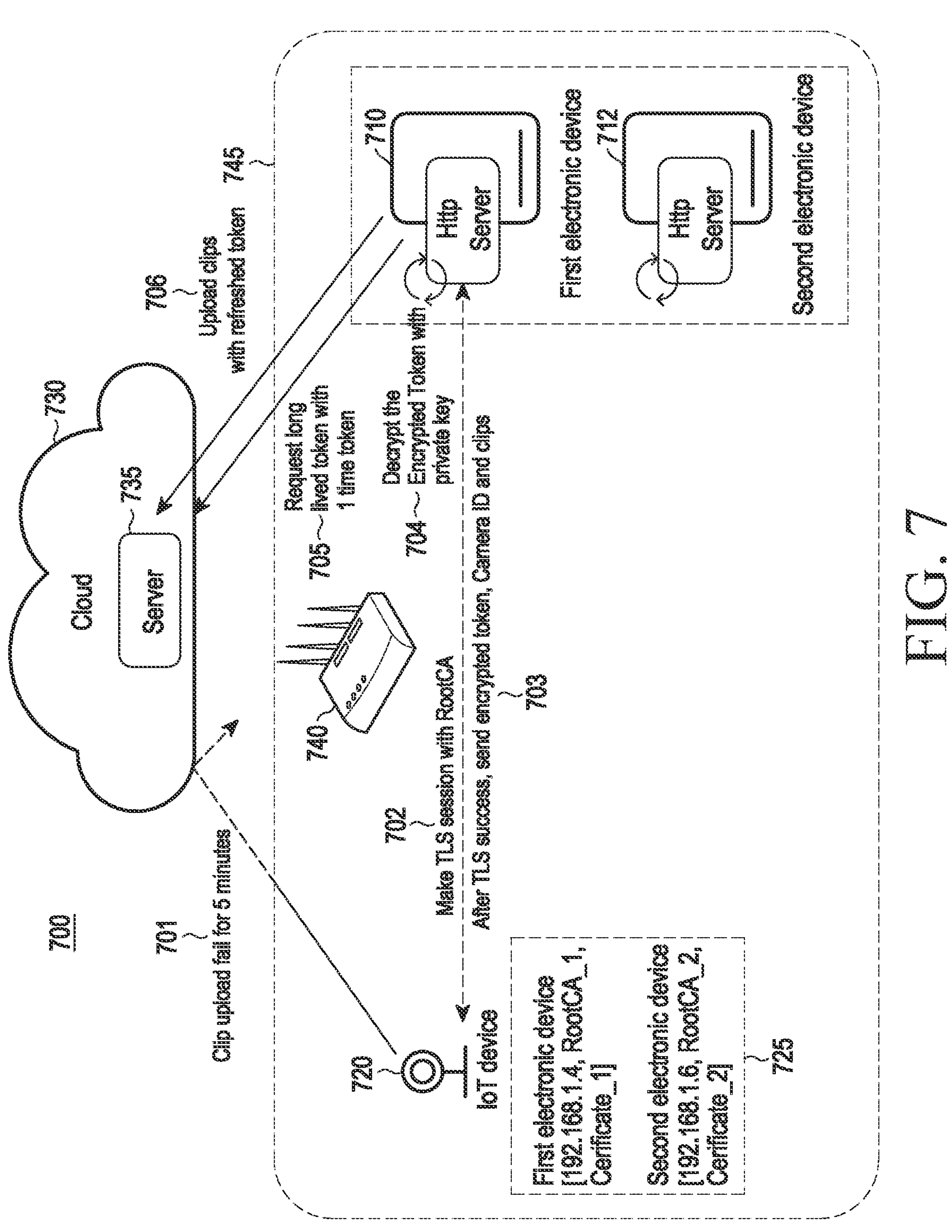
FIG. 7 illustrates an operation in which an IoT device accesses an electronic device and transmits data according to an embodiment of the disclosure.

FIG. 7 illustrates an operation of an IoT device accessing an electronic device and transmitting data according to an embodiment of the disclosure.

Referring to FIG. 7, a system 700 may include a first electronic device 710, a second electronic device 712, an IoT device 720, a cloud 730, and an AP 740. According to an embodiment, a server 735 is implemented in the cloud 730, and the server 735 may control the operation of the cloud 730. According to an embodiment, each of the first electronic device 710, the second electronic device 712, and the IoT device 720 may communicate with the cloud 730 within a coverage 745 of the AP 740. In an embodiment, at least one of operations 701 to 706 may be omitted, the order of some operations may be changed, or another operation may be added.

In operation 701, the IoT device 720 may fail to upload data (or clips) to the cloud 730 for a preconfigured period of time (e.g., 5 minutes). According to an embodiment, the IoT device 720 may store an Http server IP (e.g., 192.168.1.4), Root CA_1, and Certificate_1 for the first electronic device 710. According to an embodiment, the IoT device 720 may store an Http server IP (e.g., 192.168.1.6), Root CA_2, and Certificate_2 for the second electronic device 712. According to an embodiment, the IoT device 720 may store a list 725 of multiple electronic devices (e.g., the first electronic device 710 and the second electronic device 712) configured to broadcast device IDs and Http server IPs, and the Http server IP, root CA, and certificate for each of multiple electronic devices may be included in the list 725.

In operation 702, the IoT device 720 may generate a TLS session with the first electronic device 710 by using the root CA of the first electronic device 710 previously received from the cloud 730. In operation 703, after successfully establishing the TLS session with the first electronic device 710, the IoT device 720 may transmit an encrypted token, an IoT device ID (e.g., a camera ID), and data (or clips) that could not be transmitted in operation 701 to the first electronic device 710. In operation 704, the first electronic device 710 may decrypt the encrypted token by using a private key. In operation 705, the first electronic device 710 may request the cloud 730 to refresh the decrypted one-time token to a long-lived token. In operation 706, the first electronic device 710 may transmit the data (or clips) received in operation 703 to the cloud 730 by using a long-lived token.

Figure 8:
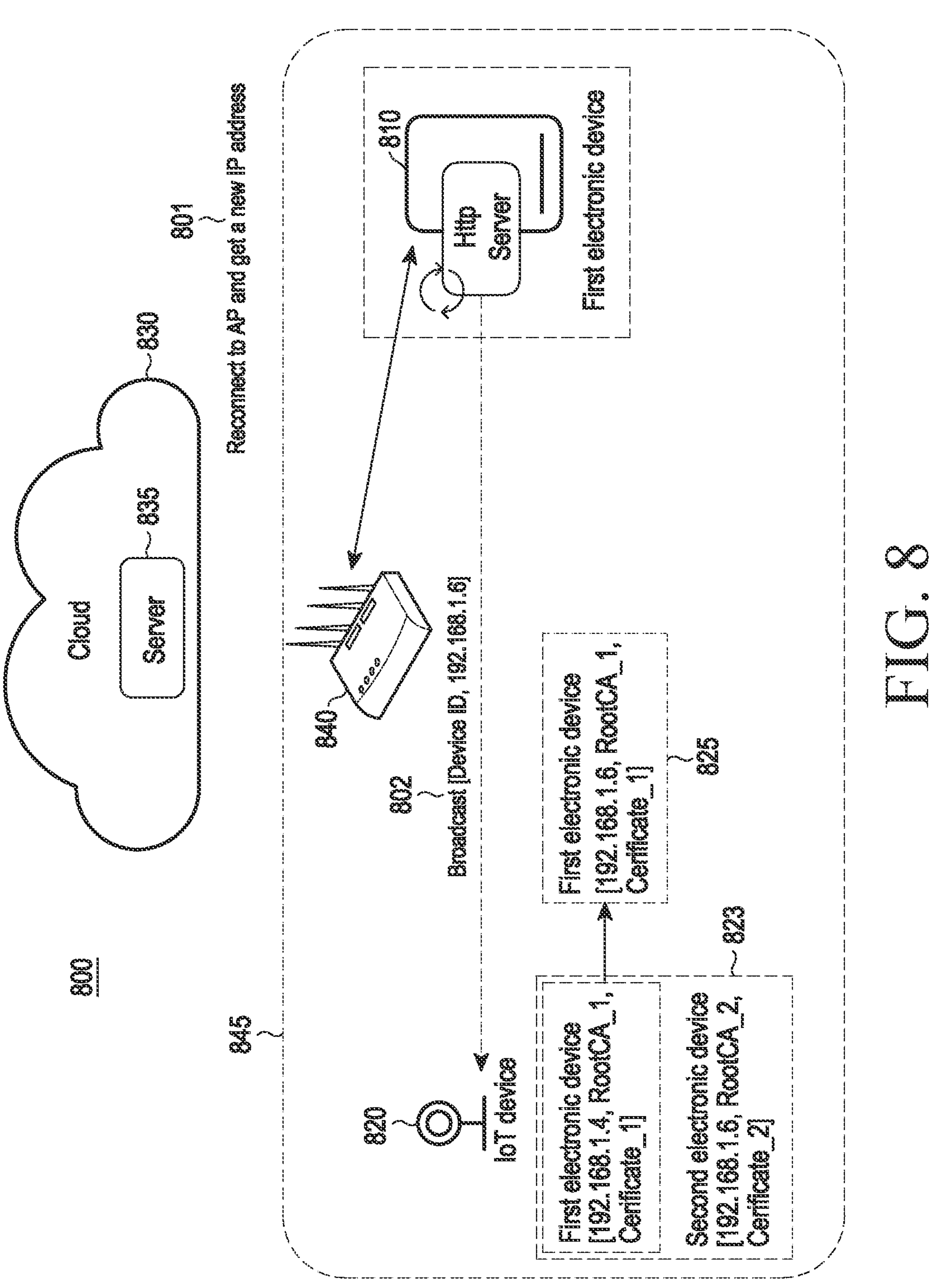
FIG. 8 illustrates an operation of obtaining a new Internet protocol (IP) address by an electronic device according to an embodiment of the disclosure.

FIG. 8 illustrates an operation of obtaining a new IP address by an electronic device according to an embodiment of the disclosure.

Referring to FIG. 8, a system 800 may include a first electronic device 810, an IoT device 820, a cloud 830, and an AP 840. According to an embodiment, a server 835 is implemented in the cloud 830, and the server 835 may control the operation of the cloud 830. According to an embodiment, each of the first electronic device 810 and the IoT device 820 may communicate with the cloud 830 within a coverage 845 of the AP 840.

In operation 801, the first electronic device 810 may be reconnected to the AP 840 and obtain a new IP address. In operation 802, the first electronic device 810 may broadcast a device ID and a new IP address. According to an embodiment, the IoT device 820 may update electronic device lists 823 and 825 using the device ID and the new IP address received from the first electronic device 810. For example, the electronic device list 823 may include information about the first electronic device 810 (e.g., 192.168.1.4, Root CA_1, Certificate_1) and information about the second electronic device (e.g., 192.168.1.6, Root CA_2, Certificate_2). For example, when the first electronic device 810 broadcasts a new IP address (e.g., 192.168.1.6), information about the first electronic device 810 included in the electronic device list 823 may be updated (indicated by reference numeral 825).

Figure 9:
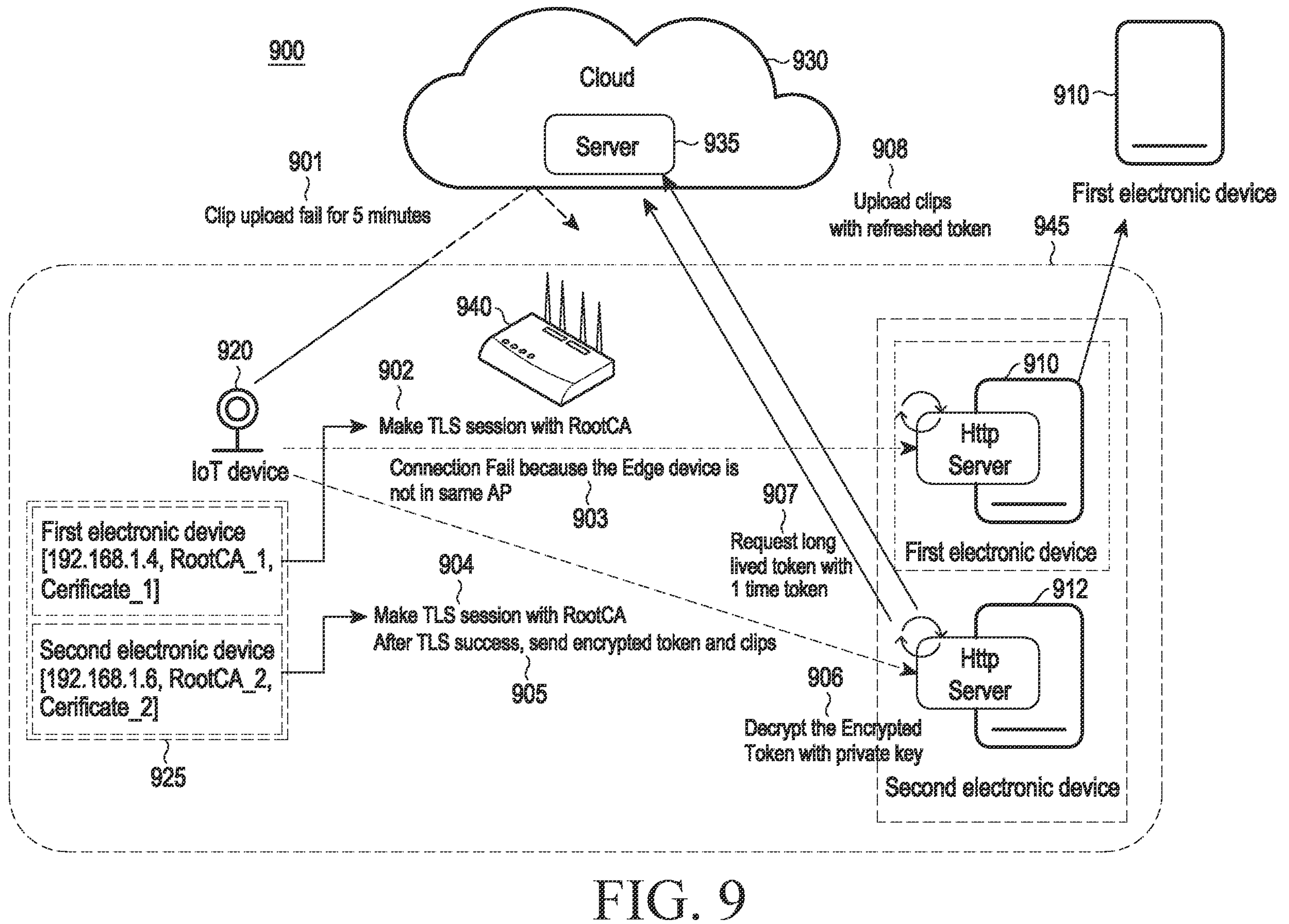
FIG. 9 illustrates a processing operation when an electronic device moves out of an access point (AP) coverage according to an embodiment of the disclosure.

FIG. 9 illustrates a processing operation when an electronic device moves out of AP coverage according to an embodiment of the disclosure.

Referring to FIG. 9, a system 900 may include a first electronic device 910, a second electronic device 912, an IoT device 920, a cloud 930, and an AP 940. According to an embodiment, a server 935 is implemented in the cloud 930, and the server 935 may control the operation of the cloud 930. According to an embodiment, the first electronic device 910 may move out of a coverage 945 of the AP 940, and each of the second electronic device 912 and the IoT device 920 may communicate with the cloud 630 within the coverage of the AP 940. In an embodiment, at least one of operations 901 to 908 may be omitted, the order of some operations may be changed, or another operation may be added.

In operation 901, the IoT device 920 may fail to upload data (or clips) to the cloud 930 for a preconfigured period of time (e.g., 5 minutes). According to an embodiment, the IoT device 920 may store an Http server IP (e.g., 192.168.1.4), Root CA_1, and Certificate_1 for the first electronic device 910. According to an embodiment, the IoT device 920 may store an Http server IP (e.g., 192.168.1.6), Root CA_2, and Certificate_2 for the second electronic device 912. According to an embodiment, the IoT device 920 may store a list 925 of multiple electronic devices (e.g., the first electronic device 910 and the second electronic device 912) configured to broadcast device IDs and Http server IPs, and the Http server IP, root CA, and certificate for each of multiple electronic devices may be included in the list 925.

In operation 902, the IoT device 920 may generate a TLS session with the first electronic device 910 by using the root CA of the first electronic device 910 previously received from the cloud 930. In operation 903, when the first electronic device 910 moves out of the coverage 945 of the AP 940, the IoT device 920 may fail to generate a TLS session with the first electronic device 910.

In operation 904, the IoT device 920 may generate a TLS session with the second electronic device 912 using the root CA of the second electronic device 912 previously received from the cloud 930. In operation 905, after successfully establishing a TLS session with the second electronic device 912, the IoT device 920 may transmit an encrypted token, IoT device ID (e.g., camera ID), and data (or clips) that could not be transmitted in operation 901 to the second electronic device 912.

In operation 906, the second electronic device 912 may decrypt the encrypted token using a private key. In operation 907, the second electronic device 912 may request the cloud 930 to refresh the decrypted one-time token to a long-lived token. In operation 908, the second electronic device 912 may transmit the data (or clips) received in operation 905 to the cloud 930 using a long-lived token.

Figure 10:
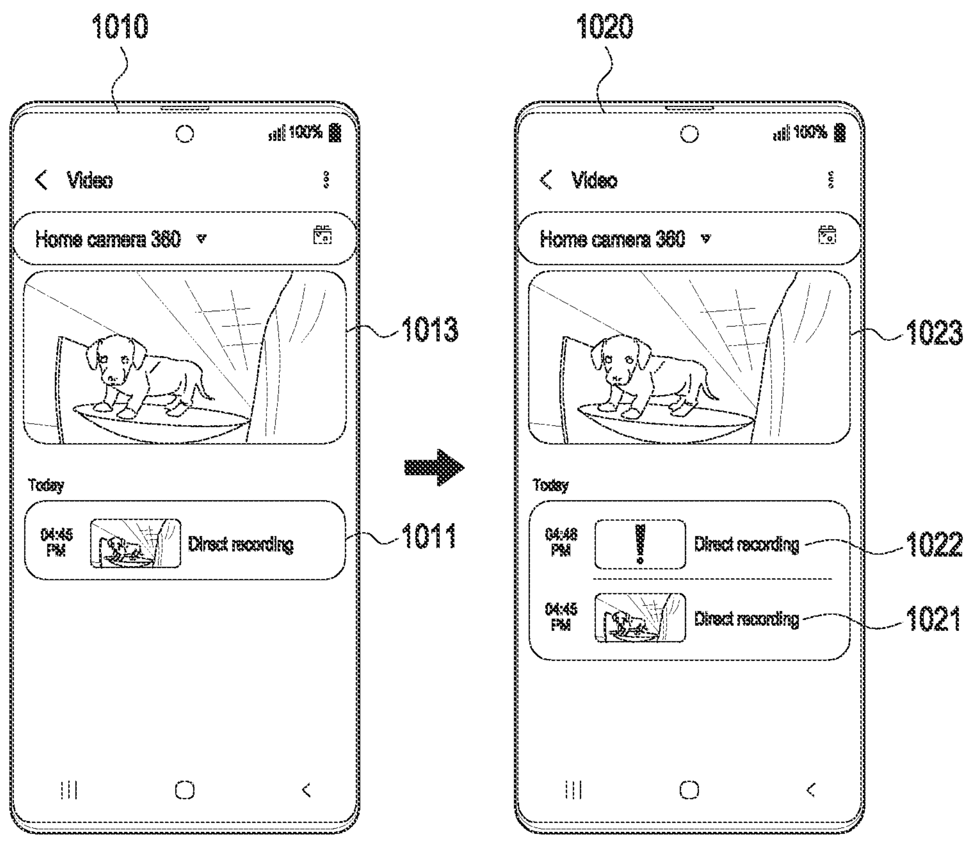
FIG. 10 illustrates a user interface (UI) when an IoT device fails to upload data to a cloud within a configured period of time according to an embodiment of the disclosure.

FIG. 10 illustrates a UI when an IoT device fails to upload data to a cloud within a configured period of time according to an embodiment of the disclosure.

Referring to FIG. 10, when a first clip recorded by an IoT device is uploaded to a cloud on a first screen 1010 provided by an electronic device, the first clip is displayed on the first screen 1010 (indicated by reference numeral 1011), and the electronic device may reproduce the first clip directly recorded by the IoT device in a partial area 1013 of a display.

In case that the IoT device fails to upload a second clip to the cloud within a configured period of time, the first clip, having been directly recorded by the IoT device at a previous time, is displayed on a second screen 1020 provided by the electronic device (indicated by reference numeral 1021), and the second clip that the IoT device has failed to upload to the cloud may be displayed as a preconfigured image 1022 (e.g., "!"). The electronic device may reproduce only the first clip directly recorded by the IoT device in a partial area 1023 of a display.

Figure 11:
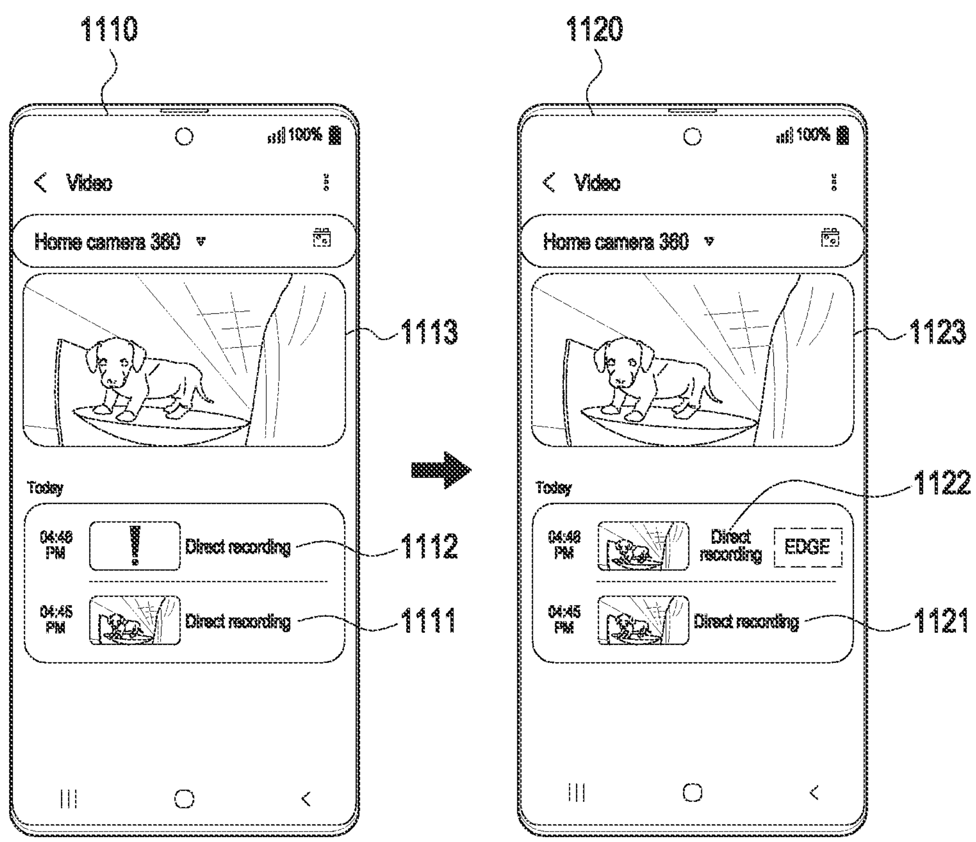
FIG. 11 illustrates a UI when an electronic device uploads data to a cloud on behalf of an IoT device according to an embodiment of the disclosure.

FIG. 11 illustrates a UI when an electronic device uploads data to a cloud on behalf of an IoT device according to an embodiment of the disclosure.

Referring to FIG. 11, when the IoT device uploads a first clip to the cloud and fails to upload a second clip to the cloud within a configured period of time, a first clip directly recorded by the IoT device at a previous time is displayed (indicated by reference numeral 1111) on a first screen 1110 provided by the electronic device, and a second clip that the IoT device has failed to upload to the cloud is displayed as a preconfigured image (1112) (e.g., "!") on the first screen 1110. The electronic device may reproduce only the first clip directly recorded by the IoT device in a partial area 1113 of a display.

When the electronic device has uploaded the second clip to the cloud on behalf of the IoT device, the first clip directly recorded by the IoT device at a previous time is displayed on a second screen 1120 provided by the electronic device (indicated by reference numeral 1121), and the second clip uploaded to the cloud by the electronic device on behalf of the IoT device may be displayed as a preconfigured image 1122 (e.g., "EDGE"). The electronic device may reproduce the first clip and the second clip in a partial area 1123 of a display.

Figure 12:
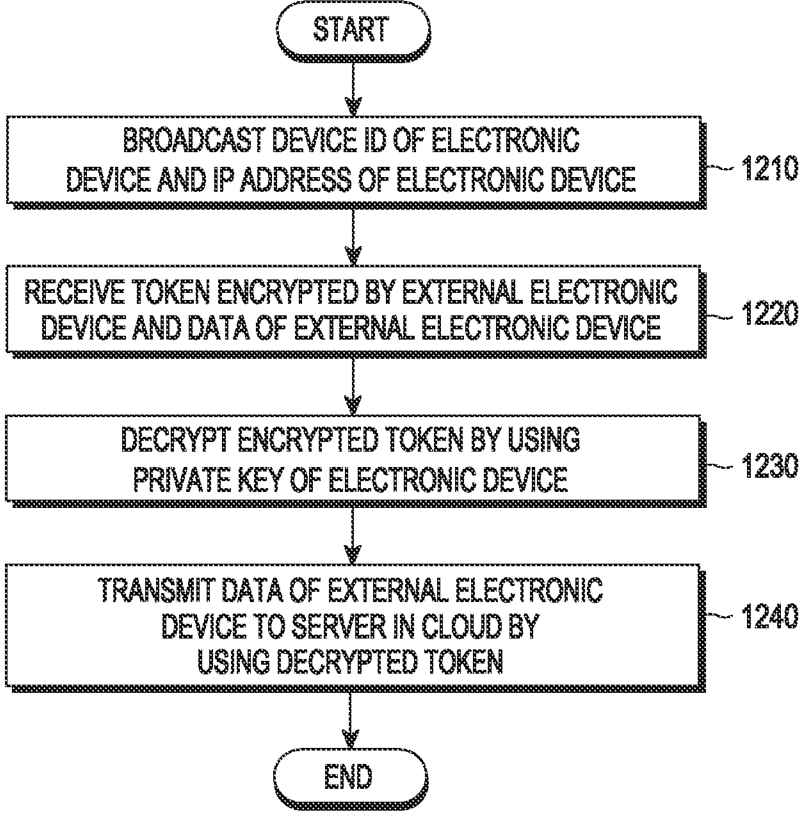
FIG. 12 is a flowchart illustrating a method for operating an electronic device according to an embodiment of the disclosure.

FIG. 12 is a flowchart illustrating a method for operating an electronic device according to an embodiment of the disclosure. The electronic device of FIG. 12 may be implemented as one of the electronic device 101 of FIG. 1, the electronic device 101 of FIG. 2, the electronic device 510 of FIG. 5, the first electronic device 610 in FIG. 6, the first electronic device 710 of FIG. 7, the first electronic device 810 of FIG. 8, or the second electronic device 912 of FIG. 9.

Referring to FIG. 12, in operation 1210, the electronic device may broadcast a device ID of the electronic device and an IP address of the electronic device. In operation 1220, the electronic device may receive a token encrypted by an external electronic device and data of the external electronic device. In operation 1230, the electronic device may decrypt the encrypted token by using a private key of the electronic device. In operation 1240, the electronic device may transmit the data of the external electronic device to a server in a cloud by using the decrypted token.

According to an embodiment, the electronic device may generate a transport layer security (TLS) session with the external electronic device in order to receive the data from the external electronic device. According to an embodiment, the electronic device may request the cloud to refresh the decrypted token to a long-lived token. According to an embodiment, the IP address of the electronic device may correspond to an address of an HTTP server installed in the electronic device. According to an embodiment, the electronic device may obtain a new IP address when the electronic device is reconnected to an access point (AP).

Figure 13:
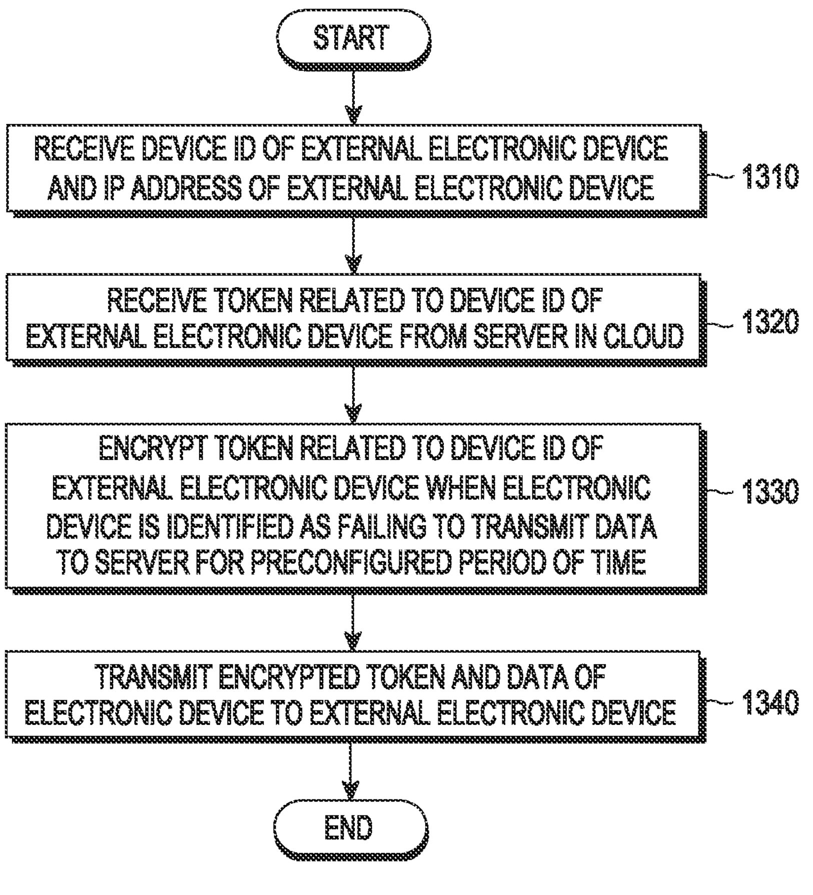
FIG. 13 is a flowchart illustrating a method for operating an electronic device according to an embodiment of the disclosure.

FIG. 13 is a flowchart illustrating a method for operating an electronic device according to an embodiment of the disclosure. The electronic device of FIG. 13 may be implemented as one of the electronic device 101 of FIG. 1, the electronic device 101 of FIG. 2, the IoT device 520 of FIG. 5, the IoT device 620 in FIG. 6, the IoT device 720 of FIG. 7, the IoT device 820 of FIG. 8, or the IoT device 920 of FIG. 9.

Referring to FIG. 13, in operation 1310, the electronic device may receive a device ID of an external electronic device and an IP address of the external electronic device. In operation 1320, the electronic device may receive a token related to the device ID of the external electronic device from a server in the cloud. In operation 1330, the electronic device may encrypt the token related to the device ID of the external electronic device when it is identified that the electronic device has failed to transmit data to the server for a preconfigured period of time. In operation 1340, the electronic device may transmit the encrypted token and the data of the electronic device to the external electronic device.

According to an embodiment, the electronic device may generate a transport layer security (TLS) session with the external electronic device in order to transmit the data to the external electronic device. According to an embodiment, the electronic device may receive a certificate related to a private key of the external electronic device and a root CA used for generating the TLS session from the server in the cloud. According to an embodiment, the electronic device may encrypt the token related to the device ID of the external electronic device by using a certificate related to a private key of the external electronic device. According to an embodiment, the electronic device may store list information about multiple electronic devices configured to broadcast device IDs and IP addresses.

According to an embodiment, an electronic device (101 of FIG. 1, 101 of FIG. 2, 510 of FIG. 5, 610 of FIG. 6, 710 of FIG. 7, 810 of FIG. 8, 912 of FIG. 9) may include a communication circuit (190 of FIG. 1, 202 of FIG. 2), and at least one processor (120 of FIG. 1, 204 of FIG. 2) connected to the communication circuit. According to an embodiment, the at least one processor may be configured to broadcast a device ID of the electronic device and an IP address of the electronic device through the communication circuit. According to an embodiment, the at least one processor may be configured to receive a token encrypted by an external electronic device and data of the external electronic device through the communication circuit. According to an embodiment, the at least one processor may be configured to decrypt the encrypted token by using a private key of the electronic device. According to an embodiment, the at least one processor may be configured to transmit the data of the external electronic device to a server in a cloud by using the decrypted token through the communication circuit.

According to an embodiment, the at least one processor may be configured to generate a transport layer security (TLS) session with the external electronic device in order to receive the data from the external electronic device. According to an embodiment, the decrypted token may be refreshed to a long-lived token. According to an embodiment, the IP address of the electronic device may correspond to an address of an HTTP server installed in the electronic device. According to an embodiment, the at least one processor may be configured to acquire a new IP address in case that the electronic device is reconnected to an access point (AP).

According to an embodiment, an electronic device (101 of FIG. 1, 101 of FIG. 2, 520 of FIG. 5, 620 of FIG. 6, 720 of FIG. 7, 820 of FIG. 8, 920 of FIG. 9) may include a communication circuit (190 of FIG. 1, 202 of FIG. 2), and at least one processor (120 of FIG. 1, 204 of FIG. 2) connected to the communication circuit. According to an embodiment, the at least one processor may be configured to receive a device ID of an external electronic device and an IP address of the external electronic device through the communication circuit. According to an embodiment, the at least one processor may be configured to receive a token related to the device ID of the external electronic device from a server in a cloud through the communication circuit. According to an embodiment, the at least one processor may be configured to encrypt the token related to the device ID of the external electronic device when the electronic device is identified as failing to transmit data to the server for a preconfigured period of time. According to an embodiment, the at least one processor may be configured to transmit the encrypted token and the data of the electronic device to the external electronic device through the communication circuit.

According to an embodiment, the at least one processor may be configured to generate a transport layer security (TLS) session with the external electronic device in order to transmit the data to the external electronic device. According to an embodiment, the at least one processor may be configured to receive a certificate related to a private key of the external electronic device and a root CA used for generating the TLS session. from the server in the cloud through the communication circuit. According to an embodiment, the at least one processor may be configured to encrypt the token related to the device ID of the external electronic device by using a certificate related to a private key of the external electronic device. According to an embodiment, the at least one processor may be configured to store list information about multiple electronic devices configured to broadcast device IDs and IP addresses.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a communication circuit;

a processor; and memory storing instructions that, when executed by the processor, cause the electronic device to:

receive, via the communication circuit, a device identification (ID) of an external electronic device and an Internet protocol (IP) address of the external electronic device, wherein the device ID and the IP address are broadcasted periodically, receive, via the communication circuit, from a server in a cloud, a token related to the device ID of the external electronic device, encrypt the token related to the device ID of the external electronic device, attempt to upload data of the electronic device to the server in the cloud, and based on the attempt to upload the data of the electronic device to the server in the cloud resulting in a failure to upload the data of the electronic device, transmit, via the communication circuit to the external electronic device, the encrypted token and the data of the electronic device, wherein the data of the electronic device is uploaded to the server in the cloud through the external electronic device based on the encrypted token.

2. The electronic device of claim 1, wherein the processor is further configured to:

receive, through the communication circuit from the server, a certificate related to a private key of the external electronic device and a root certificate authority (CA) used for generating a transport layer security (TLS) session, and generate the TLS session with the external electronic device in order to transmit the data to the external electronic device.

3. The electronic device of claim 1, wherein the instructions, when executed by the processor, further cause the electronic device to encrypt the token related to the device ID of the external electronic device by using a certificate related to a private key of the external electronic device.

4. The electronic device of claim 1, wherein the electronic device is an IP video camera that records video in real time and periodically uploads the data for the video to the server, and based on the electronic device failing to upload the data for the video to the server, wherein the processor is further configured to identify at least one external electronic device that transmits the data to the server instead.

5. The electronic device of claim 4, wherein the processor is further configured to store a list about the at least one external electronic device broadcasting at least one device ID and at least one IP address.

6. A method for operating an electronic device, the method comprising:

receiving a device identification (ID) of an external electronic device and an Internet protocol (IP) address of the external electronic device, wherein the device ID and the IP address are broadcasted periodically;

receiving, from a server in a cloud, a token related to the device ID of the external electronic device;

encrypting the token related to the device ID of the external electronic device;

attempting to upload data of the electronic device to the server in the cloud; and based on the attempt to upload the data of the electronic device to the server in the cloud resulting in a failure to upload the data of the electronic device, transmitting, to the external electronic device, the encrypted token and the data of the electronic device, wherein the data of the electronic device is uploaded to the server in the cloud through the external electronic device based on the encrypted token.

7. The method of claim 6, further comprising:

receiving a certificate related to a private key of the external electronic device and a root certificate authority (CA) used for generating a transport layer security (TLS) session; and generating the TLS session with the external electronic device in order to transmit the data to the external electronic device.

8. The method of claim 7, further comprising:

encrypting the token related to the device ID of the external electronic device by using a certificate related to a private key of the external electronic device.

9. A non-transitory computer-readable storage medium storing computer-executable instructions that, when executed by a processor of an electronic device, configure the electronic device to perform operations, the operations comprising:

receiving a device identification (ID) of an external electronic device and an Internet protocol (IP) address of the external electronic device, wherein the device ID and the IP address are broadcasted periodically;

receiving, from a server in a cloud, a token related to the device ID of the external electronic device;

encrypting the token related to the device ID of the external electronic device;

attempting to upload data of the electronic device to the server in the cloud; and based on the attempt to upload the data of the electronic device to the server in the cloud resulting in a failure to upload the data of the electronic device, transmitting, to the external electronic device, the encrypted token and the data of the electronic device, wherein the data of the electronic device is uploaded to the server in the cloud through the external electronic device based on the encrypted token.

* * * * *